United States Patent
Missio et al.

[11] 3,727,207
[45] Apr. 10, 1973

[54] INTRUSION DETECTOR

[75] Inventors: Danilo V. Missio, Belmont; Herbert Wollman, Burlington, both of Mass.

[73] Assignee: Systrom-Donner Corporation, Concord, Calif.

[22] Filed: June 24, 1970

[21] Appl. No.: 49,333

[52] U.S. Cl. .................................. 340/258 B, 356/5
[51] Int. Cl. .............................................. G08b 13/18
[58] Field of Search ...................... 340/258 R, 258 B, 340/276; 356/4, 5; 250/221

[56] References Cited

UNITED STATES PATENTS

| | | | |
|---|---|---|---|
| 3,409,368 | 11/1968 | Fernandez | 356/4 |
| 3,237,150 | 2/1966 | Beck et al. | 340/258 R |
| 3,556,657 | 1/1971 | Quelle, Jr. | 356/4 |
| 3,623,057 | 11/1971 | Hedin et al. | 340/258 B |

*Primary Examiner*—John W. Caldwell
*Assistant Examiner*—Glen R. Swann, III
*Attorney*—Paul D. Flehr, Harold C. Hohbach, Aldo J. Test, Elmer S. Albritton, Thomas O. Herbert, Baylor G. Riddell, Milton W. Schlemmer, Donald N. MacIntosh, Robert B. Block, Jerry G. Wright and Edward S. Wright

[57] ABSTRACT

An optical intrusion detector which in one package employs a radar-type concept with a time interval logic circuit to measure small changes in transmitted and received signals. A plurality of measured optical pulses are transmitted to a passive reflective target, such as a tree, fence, or other dense object, and reflected back to the same source. The rate of change between the transmitted and received pulses is measured. When the rate of change in the transmitted and received signals varies from a predetermined level, an alarm is actuated. The time interval logic employed in the detector employs three flip-flop circuits and associated circuitry. The associated circuitry with a first flip-flop circuit will cause a third flip-flop circuit to be actuated to generate an alarm signal when the time interval between the pulses transmitted and received exceeds a predetermined level. A second flip-flop circuit functions in combination with the third flip-flop circuit to indicate when a decrease in the time between the transmitted and received pulses is measured to actuate an alarm.

9 Claims, 5 Drawing Figures

PATENTED APR 10 1973 3,727,207

INVENTORS
DANILO V. MISSIO
HERBERT WOLLMAN
BY Crowley & Stevens
ATTORNEYS

INTRUSION DETECTOR

SUMMARY OF THE INVENTION

Our intrusion detector is a type of optical radar which is capable of detecting small changes in the distance to a passive reflecting target. The range to the target is proportional to the time required for a light pulse to travel to the target, be reflected and return. This time interval generates a voltage which is stored internally within the detector. If an intruder or other object passes between the detector and the target, the light which is reflected by the intruder or object will indicate a change in range which is received by the detector to produce an alarm. Our invention in addition to operating on an interrupted beam principle — using any surface in its line of sight in range as a reference reflector, may also be adapted to send out pulses of infrared energy that are not directed to any reflecting surface in its range. An internally generated pulse simulates a reference target at the system maximum range. When an object or intruder enters the beam, it will reflect the light pulse, producing a return at less than maximum range. This range change will cause an alarm.

The intrusion detector of our invention may operate on a self-contained power supply eliminating the need for cables or other cumbersome connections to distant power sources. Further, with our system, no specific reflecting surface has to be set up with and function in combination with our detector, since both the transmitter and receiver combine together to form a transceiver and may use any dense object as a reflective surface when operating in the interrupted beam mode of operation.

Briefly, our invention comprises means to generate a series of optical pulses, means to receive these optical pulses from a reflective surface and to measure the delay of the received pulses, which is proportional to range, and means in combination with the two aforesaid means to generate a signal, such as an alarm signal, when the change in the measured range exceeds a predetermined level. For ranges to the reference target in the order of 15 to 150 meters the optical time delay is on the order of 0.1 to 1.0 microsecond. A change of 1.5 meters in the range corresponds to a delay change of 0.01 microsecond, which can be detected. The detector is particularly suitable for measuring within short ranges and at safe power levels extremely small changes in the pulse variations sent and received at low cost and without injury to humans or animals.

DESCRIPTION OF THE PREFERRED EMBODIMENTS

Figure 1:
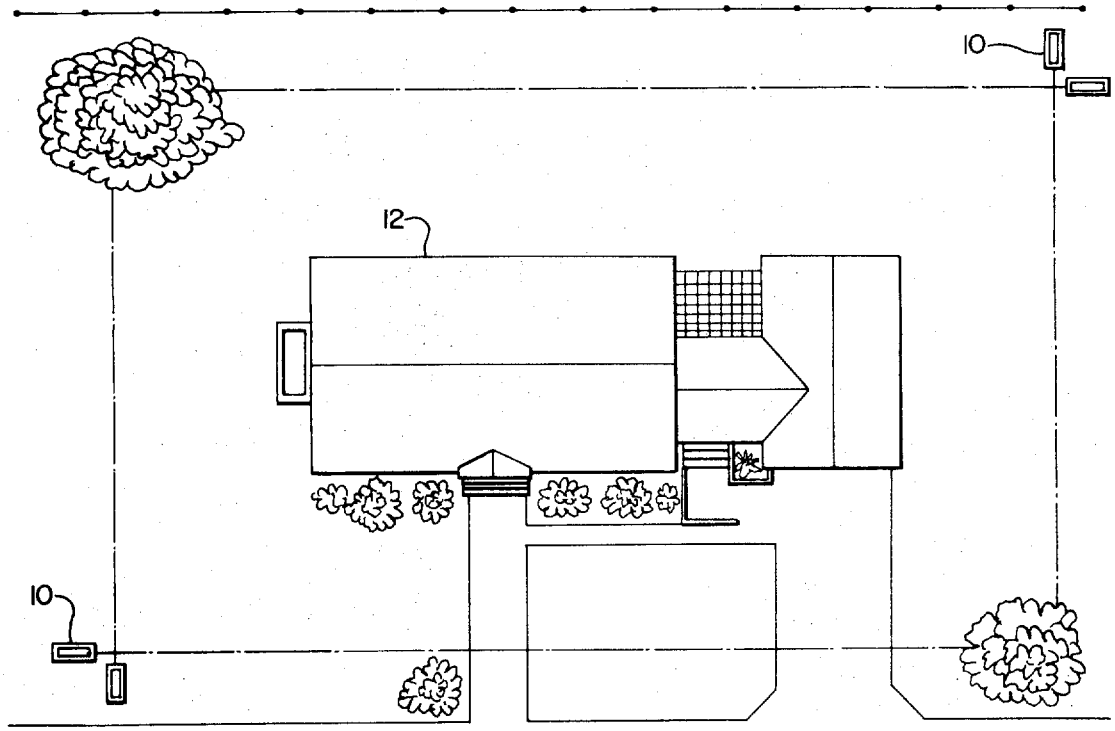
FIG. 1 is a perspective view of how the detectors of our invention may be employed to protect a predetermined area.

FIG. 1 illustrates in a perspective view one application of our invention which has been installed to protect a private home. The intrusion detectors are shown at 10 to protect a home 12. In each instance as shown in this embodiment, four of the detectors are disposed to provide a sentry system which transmits a narrow, invisible pulse of energy that cannot be tampered with or detected, because it cannot be seen with the human eye or picked up easily even if with most modern instruments. Each of the detectors as shown reflects off some inanimate surface, such as a tree or fence structure. The detector which combines both a transmitter and receiver into a single compact portable package as can be readily realized from FIG. 1 can be set up anywhere almost instantly without special reflectors or power lines. The narrow, high powered pulses provide excellent penetration of rain, snow, fog or smoke. As shown, the detector flexibility permits rapid, multiple unit deployment for safety and security, and of course, remote monitoring of any number of units in dangerous or inaccessible areas is possible. Although shown as protecting a home, it is, of course, obvious that these instruments may be used in other applications, such as plant protection, dock protection or oil refineries, riot control, civil defense, traffic control, warehouse areas, etc. As shown in FIG. 1, a complete perimeter is set up around a private home and intrusion by an individual or other object, such as a dog, cannot penetrate the perimeter without initiating the alarm system.

Figure 2:
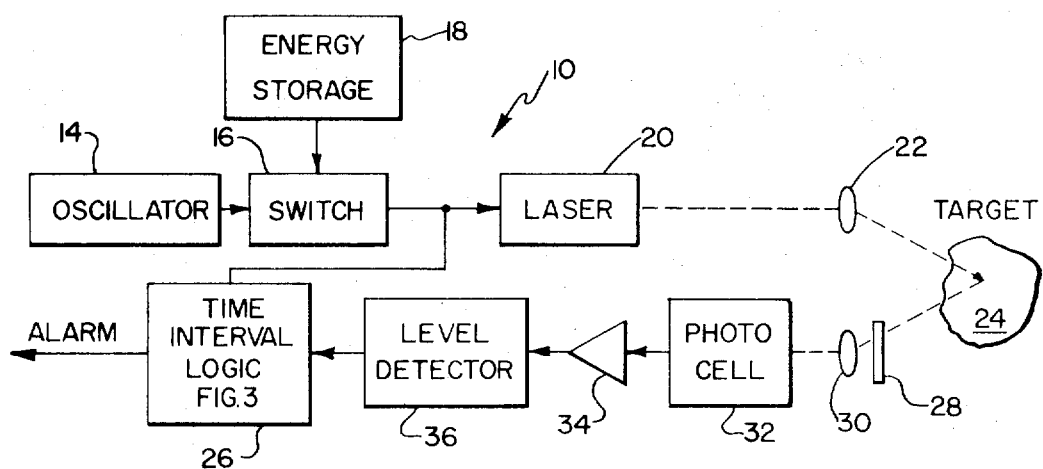
FIG. 2 is a schematic illustration of the major components of our system.

Referring to FIG. 2, the detector 10 is shown in schematic, block diagram form. An oscillator 12 produces a series of pulses at a repitition rate of 50 pulses per sound. Each pulse triggers a silicon controlled rectifier switch 16 causing the capacitors in energy storage network 18 to discharge into a laser 20. The oscillator and energy storage network are in communication with a power source, such as a battery (not shown). The laser 20 produces an extremely brief pulse of optical energy which is collimated by a lens 22 so as to illuminate a small region of a target 24. The pulses generated are generally in the wave length range of the infrared region and have a pulse duration of less than about 0.1 microseconds. At the same time that the discharge occurs from the energy storage 18 to the laser 20, which discharge to the laser is about 70 volts and 70 amps, a portion of this discharge is diverted to the time interval logic shown generally at 26. However, a resistor R in the line from the energy storage network 18 to the time interval logic 26 reduces the amount of voltage applied to the time interval logic, say to about 1 volt. The application of the voltage to the time interval logic initiates the measurement of a timed interval, as will be described in more detail later.

The detector 10 has a narrow band pass optical filter 28 and a lens 30 which focuses a portion of the reflected laser light onto a high speed photocell 32. The electrical output of the photocell is amplified in amplifier 34 from about a microvolt to between approximately 0.1 to 1 volts and causes a level detector 36 to produce an output pulse whenever the laser light is received at greater than a predetermined intensity. The level detector 36 employed may be a differential amplifier having a negative bias of 0.1 volts, and if the received pulse from the photocell and amplifier does not exceed more than 0.1 volts, then a pulse will not be sent to the time interval logic 26 and an alarm actuated. The purpose of the level detector is primarily to eliminate or ignore noise in the system. However, if desired, the level detector may be eliminated and the pulses regardless of value transmitted directly from the amplifier to a modified form of time interval logic 26. When a pulse is transmitted from the level detector, and there is a change in the time interval between the laser pulse and the received pulse, greater than a predetermined value, then the time interval logic circuit will be actuated to generate a signal, such as an alarm.

Figure 3:
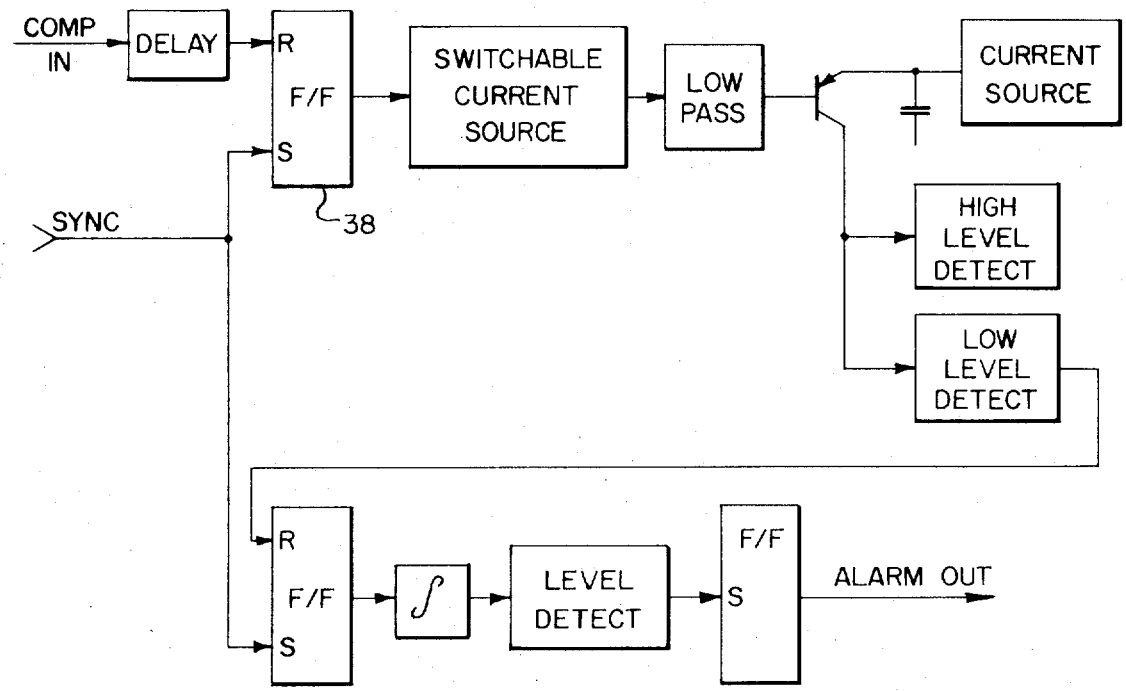
FIG. 3 is a schematic illustration of the time interval logic employed with our invention.
Figure 4:
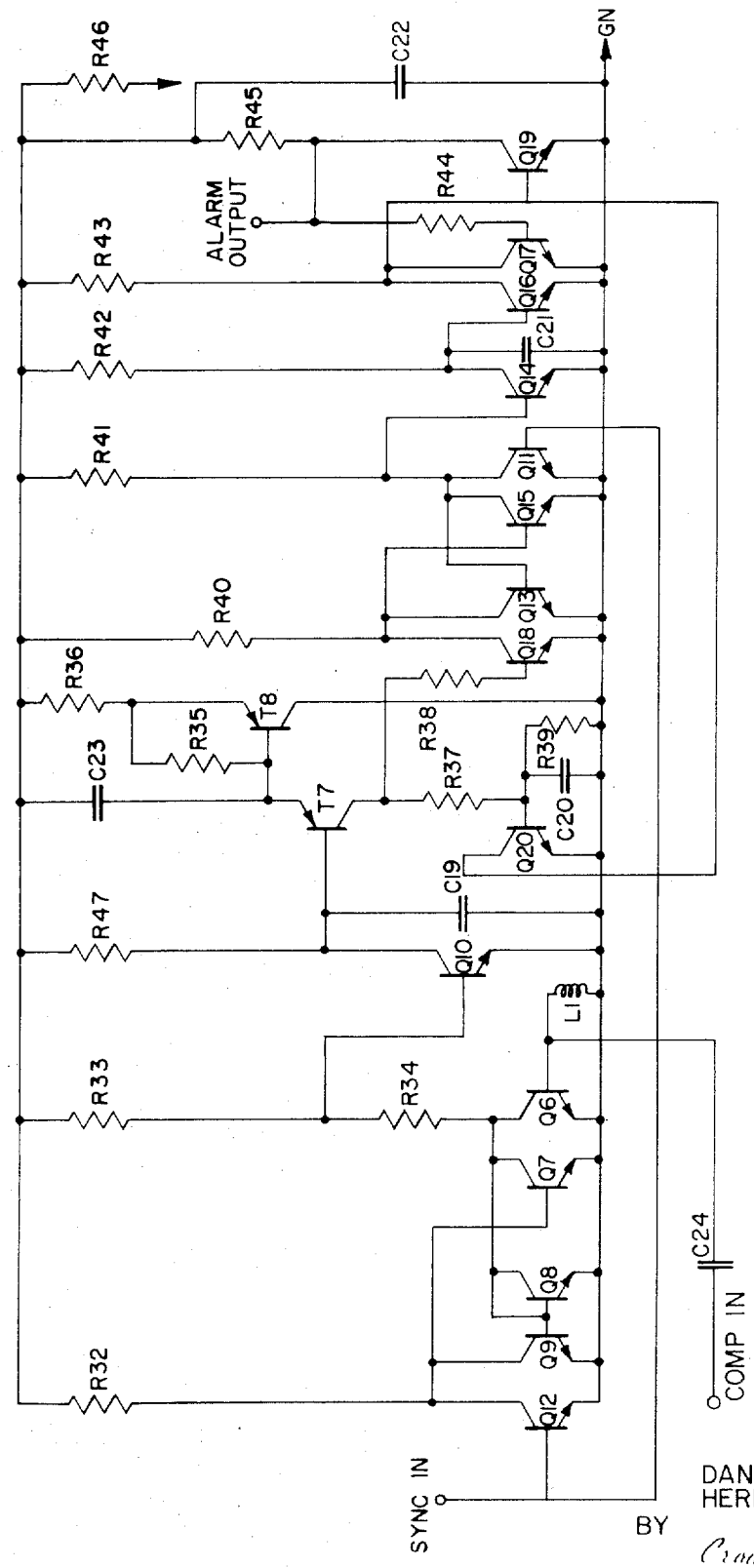
FIG. 4 is a circuit diagram of the time interval logic.

Referring to FIG. 4, a schematic diagram of the time interval logic 26 is shown. Transistors Q7–Q9 form a ' flip-flop circuit shown as 38 in FIG. 3 which is set by a transistor Q12 by a synchronizing pulse at "sync in" when the laser fires. The flip-flop is reset by a Q6 and delay circuit C24–L1, a fixed delay, such as 0.05 microseconds, after the returned pulses cause the level detector to produce a pulse and transmit it to the point marked "Comp. In.". After the reset, transistor Q10 is off allowing resistor R47 to charge capacitor C19 to the supply voltage. When the laser pulse sets the flip-flop Q7–Q9, resistors R33 and R34 and transistor Q8 establish a bias on transistor Q10 which causes it to conduct a relatively constant current. This current discharges capacitor C19 producing a negative going pulse, the amplitude of which is a nearly linear function of the optical delay. Transistor T7 causes capacitor C23 to be charged to one diode voltage drop less than the peak swing on C19. Resistor R35 and transistor T8 act as a constant current source which slowly discharges C23. If the range and optical time delay and hence peak swing on C19 are constant on each cycle; that is, when the pulses are received from the level detector, then transistor T7 must recharge C23 by the small amount that resistor R35 has discharged it. This small charge flowing through the collector of T7 will turn on Q18 but will not turn on Q20 due to C20 in its base circuit. If the range should increase suddenly, the detector is delayed, the peak signal on C19 will increase, resulting in a relatively large change in the voltage on C23. When this larger charge flows through T7, it causes both Q18 and Q20 to turn on. When Q20 turns on, it sets the output flip-flop comprised of Q17 and Q19 to produce an output of voltage to drive an alarm. As described above, the capacitor C23 serves a dual function in this particular circuit, both as a differentiator and for storage of voltage. Conversely, if the range is decreased only slightly, the reduced swing on C19 will be insufficient to turn on both T7 and Q18. The flip-flop composed of Q13–Q15 is set by a Q11 each time the laser fires. Normally, it is reset within a microsecond by Q18.

If the range decreases more than slightly, for example, more than 1.5 meters, Q18 does not turn on and does not reset the flip-flop composed of Q13–Q15. This leaves transistor Q14 off, allowing R42 to charge capacitor C21 and turn on Q16 which sets the alarm output flip-flop. The alarm output flip-flop can be reset by a switch which grounds the base of Q17.

By way of illustration, the operation of our invention will be described in reference to an optical detector 10 which is adapted to transmit and receive pulses from a reflective surface, such as a tree, say for example, a hundred feet away from the optical detector. Detector 10 is actuated by turning on the power supply, such as a battery (not shown). The detector zeros itself in after the first few pulses have been transmitted and received. The oscillator 14 produces a series of pulses at a rate of 50 pulses per second. These pulses trigger the silicon-controlled rectifier switch which cause the capacitors in the energy storage network 18 to discharge into the laser 20 at about 70 volts and 70 amps. The laser produces an extremely brief pulse of optical energy in the wave length range of from 0.1 to 2.0 micrometer, say for example 0.9 micrometer, which pulses are non-visible and are collimated by the lens 22 to illuminate a small region of the target at 100 feet. The diameter may vary from about 1 inch at source to 5 inches at the target. At the same time, a portion of the discharge from the capacitors is diverted to the time interval logic 26 through the resistor R at a value of about 1 volt. This synchronizing pulse generated when the laser fires is shown as "sync in" in FIG. 4, which pulse sets the flip-flop circuit Q7 and Q9. The pulse fired by the laser strikes the target and is returned to the photocell 32 in approximately 0.2 seconds. The optical pulse received in the photocell is transmitted as voltage from the amplifier 34 at a range of about 0.1 volts to 10 volts and enters level detector 36. If the voltage entering the level detector does not exceed about 0.1 volts, then no further pulse is sent to the time interval logic. However, if the voltage entering the level detector exceeds the present level, say, for example 0.1 volts, then this pulse is transmitted to the time interval logic and enters the circuit in FIG. 4 at the point marked "Comp. In.".

For a system with a designed maximum range of 50 meters, the optical delay would be in the range from 0 to 0.33 microsecond. If the fixed electronic delay inherent in the amplifiers, level detector, and delay circuit C24–L1 is 0.1 microsecond, then the Q7–Q9 flip-flop is reset 0.1 to 0.43 microsecond after the laser firing sets it. By setting the bias on Q10 to conduct a current which discharges C19 at a rate of 20 volts per microsecond, the voltage pulse on C19 will be between 2.0 and 8.6 volts. A change in range of 1.5 meters changes the delay by 0.01 microsecond, and therefore the voltage pulse on C19 by 0.2 volt. Resistor R35 is selected so that a reduction of 0.2 volts in the C19 voltage pulse is sufficient to avoid turning on Q18, thereby producing an alarm. Capacitor C20 is selected so that an increase of 0.2 volt is just sufficient to turn on Q20, causing an alarm.

Figure 5:
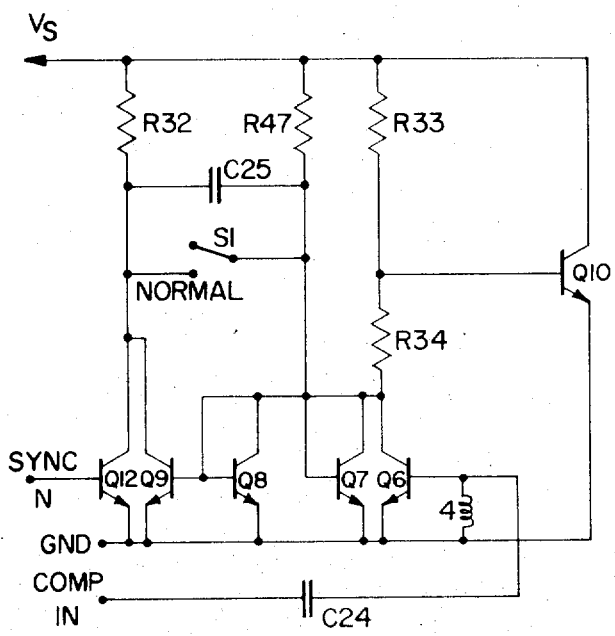
FIG. 5 is a partial circuit diagram of an alternative embodiment of our invention.

In the pulse-no-pulse mode of operation, if the flip-flop 38 comprised of transistors Q7–Q9 as shown in FIG. 4, is modified as in FIG. 5 to form a monostable multivibrator, it will reset itself automatically even if no optical reflected pulse is received. In the above example, the multivibrator would reset itself 0.44 microseconds after it was set, unless a received optical pulse resets it earlier. The capacitor would have a 8.8 volt pulse when no optical return was received. An intruder entering the beam within the maximum range of 50 meters would produce a return which would cause the multivibrator to be reset in less than 0.43 microseconds, and thereby cause an alarm. This mode of operation is useful when it is necessary to monitor a roadway, a body of water, or any other open area which does not have any convenient target reflectors. Switch S1 can be shorted, restoring normal operation.

Having described our invention, what we now claim is:

1. In an optical detector system, means for transmitting optical pulses to a target, means including a photocell for receiving pulses reflected from the target and converting said pulses to electrical pulses, first bistable means adapted for switching from a first state to a second state in response to the transmitted pulses and for returning to the first state in response to the reflected pulses, second bistable means arranged for switching from a first state to a second state in response to the transmitted pulses and for returning to its first state when the first bistable means remains in its second state longer than a predetermined maximum time, third bistable means arranged for switching to an alarm state when the first bistable means remains in its second state less than a predetermined minimum time, said third bistable means also being arranged for switching to the alarm state when the second bistable means remains in its second state for a time greater than the predetermined maximum time.

2. An optical detector system as in claim 1 wherein the means for transmitting optical pulses includes a laser.

3. An optical detector system as in claim 1 wherein the optical pulses are in the infrared range.

4. An optical detector system as in claim 1 together with manually operable means for switching the third bistable means from its alarm state to another state.

5. An optical detector system as in claim 1 together with means for returning the first bistable means to its first state a predetermined time after the pulses are transmitted.

6. In an intrusion detecting system, laser means for transmitting pulses of light along a path toward a fixed object, means associated with the laser means for receiving pulses reflected back along the path, means providing an electrical signal corresponding to the interval between successive ones of the transmitted and received pulses, said signal having a normal value corresponding to the transit time of pulses reflected from the fixed object, and means responsive to the signal for actuating an alarm if said signal varies from its normal value by more than a predetermined amount.

7. In a method for detecting interruptions in a pulsed beam and actuating an alarm when the beam is interrupted, the steps of transmitting a plurality of optical pulses along a path from a source toward a fixed target, receiving pulses reflected back along the path, determining the time interval between successive ones of the transmitted and reflected pulses, said time interval having a normal value corresponding to the transit time of pulses reflected by the fixed object, and actuating an alarm if the time interval varies from its normal value by a predetermined amount.

8. In an intrusion detecting system, laser means for transmitting pulses of light along a path toward a fixed object, means associated with the laser means for receiving pulses reflected back along the path, means providing an electrical signal having a duration corresponding to the time interval between successive ones of the transmitted and received pulses, said signal having a normal duration corresponding to the transit time of pulses reflected from the fixed object, bistable means arranged for switching from a first state to a second state in response to each transmitted pulse and for returning to the first state when the duration of the signal exceeds a predetermined maximum, and additional bistable means arranged for switching to an alarm state when the first named bistable means remains in its second state for a period of time greater than the predetermined maximum, said additional bistable means also being arranged for switching to the alarm state when the duration of the signal is less than a predetermined minimum.

9. In a method for detecting interruptions in a pulsed beam and actuating an alarm when the beam is interrupted, the steps of transmitting a plurality of optical pulses along a path from a source toward a fixed target, receiving pulses reflected back along the path, determining the time interval between successive ones of the transmitted and reflected pulses, said time interval having a normal value corresponding to the transit time of pulses reflected by the fixed object, switching a bistable element from a first state to a second state in response to each transmitted pulse, returning the bistable element to the first state if the time interval determined exceeds a predetermined maximum, and switching an additional bistable element to an alarm state if the first named bistable element remains in its second state for a period of time greater than the predetermined maximum.

* * * * *